United States Patent [19]

Hakanen

[11] Patent Number: 5,189,698
[45] Date of Patent: Feb. 23, 1993

[54] HOLDER SUITABLE FOR PREVENTING INADVERTENT DETACHMENT OF A TELEPHONE OR ITS OPERATING HANDPIECE HELD BY THE HOLDER

[75] Inventor: Pekka Hakanen, Turku, Finland

[73] Assignee: Nokia Mobile Phones Ltd., Salo, Finland

[21] Appl. No.: 674,521

[22] Filed: Mar. 22, 1991

[30] Foreign Application Priority Data

Apr. 12, 1990 [FI] Finland .................................. 901892

[51] Int. Cl.⁵ ............................................ H04R 25/00
[52] U.S. Cl. ..................................... 379/455; 379/433; 379/454; D14/138
[58] Field of Search ................ 379/419, 422, 425, 445, 379/448, 433, 454, 455; D14/138

[56] References Cited

U.S. PATENT DOCUMENTS

| D. 325,577 | 4/1992 | Karlin | D14/138 |
|---|---|---|---|
| 4,472,606 | 9/1984 | Krolopp et al. | 379/455 |
| 4,488,009 | 12/1984 | Sherman | 379/422 |
| 4,782,526 | 11/1988 | Uchino et al. | 379/419 |
| 4,782,528 | 11/1988 | Inoue et al. | 379/455 |
| 4,969,187 | 11/1990 | Hattori et al. | 379/433 |
| 5,040,712 | 8/1991 | Pesonen et al. | 379/454 |
| 5,113,436 | 5/1992 | Jarvela et al. | 379/455 |

OTHER PUBLICATIONS

Motorola, "Technical Developments, vol. 3", Handset Latch and Delatch System, Mar. 1983.
Motorola, "DYNA TAC Cellular Mobile Telephone", Mechanical Parts, Aug. 31, 1983.

Primary Examiner—Curtis Kuntz
Assistant Examiner—William D. Cumming
Attorney, Agent, or Firm—Darby & Darby

[57] ABSTRACT

A holder for a telephone or its operating handpiece (1), the holder comprising base plate (2) and side plates (3) extending upwardly from the edges of the base plate so that the telephone or its operating handpiece can be inserted between said side plates. Opposing sides of the side plates (3) are provided with elongated ridges (4) that are compatible with grooves along the sides of the telephone or its operating handpiece. The base plate (2) of the holder includes springs (6) which push the telephone or its operating handpiece (1) outwardly so that the ridges (4) align themselves with latching recesses (7) at the grooves (5).

8 Claims, 1 Drawing Sheet

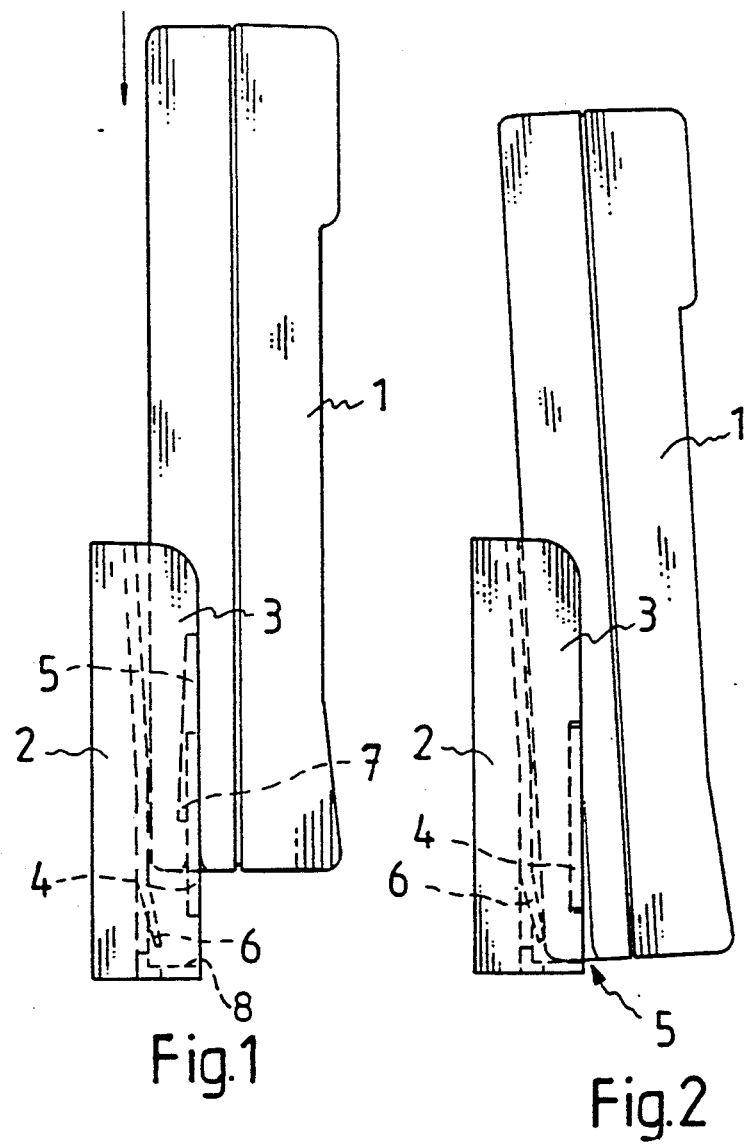
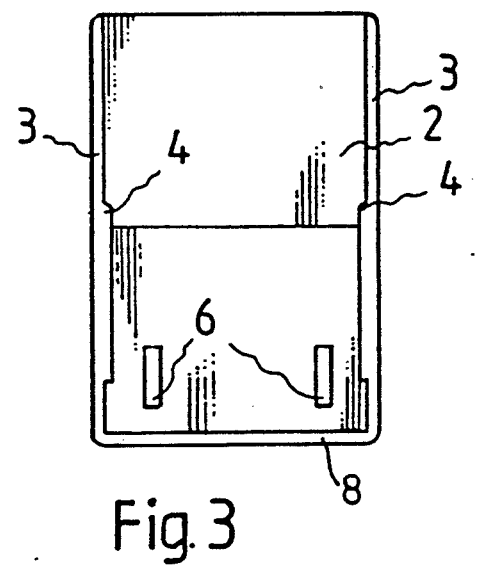

HOLDER SUITABLE FOR PREVENTING INADVERTENT DETACHMENT OF A TELEPHONE OR ITS OPERATING HANDPIECE HELD BY THE HOLDER

BACKGROUND OF THE INVENTION

1. Field of the Invention

The present invention relates to a holder for a telephone or its operating handpiece, said holder comprising a base plate and side plates extending from the edges of the base plate so that the telephone or its operating handpiece can be placed between said side plates, and the opposing sides of the side plates are provided with elongated ridges that are compatible with grooves designed to the sides of the telephone or its operating handpiece.

2. Discussion of Related Art

The task of holding a telephone or its handpiece in a holder is assured against inadvertent detachment of the inserted piece by means of different conventional designs, additional members, or complicated latching mechanisms. The disadvantages of prior art designs are: They contain many discrete members, their assembly is complicated, and moreover, they also often even make the telephone difficult to use.

SUMMARY OF THE INVENTION

It is an object of the present invention to overcome the above described disadvantages. A holder according to the invention is characterized in that the base plate of the holder has springs which push the telephone or its operating handpiece outwardly so that the holder ridges align themselves with latching recesses designed to the handpiece grooves.

An embodiment of the invention is characterized in that the springs are comprised of leaf springs extending outwardly from the base plate, said leaf springs being an integral construction with the holder.

When the holder for a telephone or its operating handpiece is in the above described manner comprised of a single integral piece, no assembly work is needed. By implementing the holder as a single extrusion-molded piece, even lower production costs will be achieved. The latching mechanism can be fitted to a very small space, and the detachment from and reattachment of the telephone or operating handpiece to the holder can be effected with a single grasp.

In the following the invention is described by way of an exemplifying embodiment with reference to the attached drawings in which FIG. 1 shows the insertion of a telephone or its operating handpiece to the holder, FIG. 2 shows the telephone or its operating handpiece latched to the holder, and FIG. 3 shows the holder in a front view.

DESCRIPTION OF THE PREFERRED EMBODIMENT

A holder for a telephone or its operating handpiece 1 is comprised of a base plate 2 and side plates 3 extending upwardly from the edges of the base plate so that the telephone or its operating handpiece 1 can be inserted between said side plates. The opposing sides of the side plates 3 are provided with elongated ridges 4 that are compatible with grooves 5 provided at the sides of the telephone or its operating handpiece 1. The base late 2 of the holder has springs 6 which push the telephone or its operating handpiece 1 outwardly so that the ridges 4 align themselves with latching recesses 7 provided at the grooves 5. The springs 6 are comprised of leaf springs extending outwardly from the base plate, said leaf springs being an integral construction with the holder.

As it is evident from the diagram, the springs 6 are located at the lower part of the holder. Correspondingly, the latching recesses 7 in the grooves 5 of the telephone or its operating handpiece 1 are also located at the lower part of the telephone or its operating handpiece. The lengths of the latching recesses 7 are essentially equal to the lengths of the ridges 4. When the telephone or its operating handpiece is inserted in the holder as illustrated in FIG. 1, the rear wall of the telephone or its operating handpiece slides along the base plate under the guidance of the ridges 4. When the telephone or its operating handpiece reaches the bottom position above the bottom plate 8 which extends from the lower edge of the base 2 between the side plates 3, the springs 6 push the lower part of the telephone outwardly so that the ridges become seated in the latching recesses 7. For the detachment of the telephone or its operating handpiece 1, pushing at the lower part of the telephone or its operating handpiece detaches the device from the latching recesses, whereby the springs 6 give simultaneously so as to allow the telephone or its operating handpiece to be lifted upward and off the holder.

The invention is not limited by the above-described exemplifying embodiment, but instead, can also be implemented so that the grooves are designed in the holder, while the ridges are correspondingly placed with the telephone or its operating handpiece. The spring force can also be effected by means of discrete spring elements. Further, the latching function can alternatively be designed at the upper end of the telephone or its operating handpiece. The function of the alternative embodiments are, however, identical.

I claim:

1. A holder for a telephone or its operating handpiece, the holder being formed of a single integral piece and comprising:

a base having a face;

two elongated side plates each extending from the face and being spaced apart from each other and facing each other;

a bottom plate extending from the face and arranged so that the telephone or its operating handpiece is movable between the side plates to reach the bottom plate;

latching means spaced from the base and formed on each of said side plates for latching the telephone or its operating handpiece; and spring means protruding outwardly from the face of the base, the face being bounded by the side plates and the bottom plate, whereby the telephone or its operating handpiece is movable between the side plates under manual pressure into a positing where a contact area of the telephone or operating handpiece compresses the spring means and where manual release of the handpiece or its operating handpiece allows the spring means to bias back and push the contact area of the telephone or its operating handpiece further away from the base.

2. A holder as in claim 2, wherein said spring means comprise leaf springs extending outwardly form the base.

3. A holder as in claim 5, wherein the latching means includes two elongated ridges each extending from a respective one of the two elongated side plates and towards each other so as to be spaced from the face, the ridges being elongated in the same direction of elongation as the side plates, whereby the ridges may become seated within a respective recess of the telephone or its operating handpiece when the ridges and the recesses are aligned with each other.

4. A holder as in claim 3, wherein said bottom plate extends between the side plates and is elongated in a direction transverse to the direction of elongation of the side plates.

5. A holder as in claim 4, wherein the face of the base is bounded by four edges, each of the bottom and side plates extending from an associated one of three of the edges.

6. In combination,
 a housing of a telephone or its operating handpiece;
 a holder for said housing and comprising integral elements defining
  a base having a face;
  two elongated side plates each extending from the face and being spaced apart from each other and facing each other;
  a bottom plate extending from the face and arranged so that said housing is movable between the side plates to reach the bottom plate; and
  spring means protruding outwardly from the face of the base and between the side plates, whereby the housing is movable between the side plates under manual pressure into a position where manual release of said housing allows the spring means to bias back and push a contact area of the housing further away from said base; and
 latching means for latching together said holder and said housing, said latching means including latching recesses formed on said housing for allowing said spring means to bias back while pushing the contact area further away form said base.

7. A combination as in claim 6, wherein said latching means includes ridges extending from said holder and seating into said recesses when aligned therewith in response to said spring means biasing back and pushing the contact area.

8. A combination as in claim 7, wherein said recesses and said ridges are elongated in the same direction and each have a substantially equal length.

* * * * *